United States Patent
Shi et al.

(10) Patent No.: US 11,880,798 B2
(45) Date of Patent: Jan. 23, 2024

(54) DETERMINING SECTION CONFORMITY AND PROVIDING RECOMMENDATIONS

(71) Applicant: Capital One Services, LLC, McLean, VA (US)

(72) Inventors: Shan Shi, McLean, VA (US); Shunzhi Ye, McLean, VA (US); Keelan Downton, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 198 days.

(21) Appl. No.: 17/321,585

(22) Filed: May 17, 2021

(65) Prior Publication Data

US 2022/0366344 A1    Nov. 17, 2022

(51) Int. Cl.
*G06Q 10/0639* (2023.01)
*G06N 20/00* (2019.01)
*G06F 16/93* (2019.01)
*G06V 30/416* (2022.01)
*G06V 30/414* (2022.01)

(52) U.S. Cl.
CPC ....... *G06Q 10/06393* (2013.01); *G06F 16/93* (2019.01); *G06N 20/00* (2019.01); *G06V 30/414* (2022.01)

(58) Field of Classification Search
CPC .............. G06Q 10/06393; G06F 16/93; G06F 16/3347; G06V 30/414; G06N 20/00
See application file for complete search history.

(56) References Cited

U.S. PATENT DOCUMENTS

| | | | | |
|---|---|---|---|---|
| 11,461,552 | B2 * | 10/2022 | Han | G06V 30/19113 |
| 11,507,735 | B2 * | 11/2022 | Lunaparra | G06F 40/166 |
| 11,562,143 | B2 * | 1/2023 | Priestas | G06F 40/284 |
| 11,562,453 | B2 * | 1/2023 | Eidelman | G06F 40/263 |
| 2018/0089382 | A1 * | 3/2018 | Allen | G06F 40/295 |
| 2018/0322110 | A1 * | 11/2018 | Rhodes | G16H 15/00 |
| 2020/0364404 | A1 * | 11/2020 | Priestas | G06V 30/40 |
| 2021/0057068 | A1 * | 2/2021 | Dandala | G16H 15/00 |
| 2021/0073239 | A1 * | 3/2021 | Klimuk | G06F 16/24578 |
| 2022/0004713 | A1 * | 1/2022 | Han | G06Q 50/18 |
| 2022/0058338 | A1 * | 2/2022 | Hanson | G08B 21/18 |

* cited by examiner

*Primary Examiner* — Dylan C White
(74) *Attorney, Agent, or Firm* — Perkins Coie LLP

(57) ABSTRACT

Methods and systems are described herein for receiving a document (e.g., a technical paper), identifying sections of the document, and inputting each section into a corresponding machine learning model that has been trained using previously reviewed documents to process text and other data within a specific section. The machine learning model may output a score indicating the degree of compliance to a particular standard of a particular document. In addition, various recommendations for content to be added to the document may be identified and provided to the user along with the score for each section.

20 Claims, 8 Drawing Sheets

| Predetermined Section Template Label | Textual Content | Image Content |
|---|---|---|
| Modeling Approach | <model choice> <interdependency> <interaction> ... | <link1> |
| Data | <data source> <data processing> <data quality> ... | <link2> |
| Model Selection | <selection criteria> <configuration> ... | |
| Outcome Analysis | <benchmarking> <stress testing> ... | <link3> |
| Deployment | <execution environment> <process and results> ... | |

FIG. 2

| Modeling Approach | Development Data | Model Selection | Outcome Analysis |
|---|---|---|---|
| Model Choice | Data Source | Selection Criteria | Outcome to business needs |
| Interdependency | Data processing | Relationship to Outcome | Sensitivity analysis |
| Interaction | Data quality | Final model specificaitons | Benchmarking |
| Qualitative information and expert judgment | | Supportive Choice | Stress testing |
| Alternative approach | | Configuration | |

| Keyword Identifier | Recommendation |
|---|---|
| Keyword 1 | Recommendation 1 |
| Keyword 2 | Recommendation 2 |
| Keyword 3 | Recommendation 3 |
| Key phrase 1 | Recommendation 4 |
| Key phrase 2 | Recommendation 5 |

FIG. 6

DETERMINING SECTION CONFORMITY AND PROVIDING RECOMMENDATIONS

BACKGROUND

Enterprises generate a plethora of documents, many of them in an electronic form. Some documents may be technical papers, while other documents may be various policies and/or user instructions. In many instances, enterprises require that documents comply with certain requirements, e.g., that documents are in specific format or include specific content. To make sure those requirements are met, human editors generally review the documents and provide feedback to the authors on whether the document is compliant. In addition, certain sections of a document may be improved if those sections include specific content. Reviewing various sections of a document and giving a user feedback is also generally performed by a human reader. The problem with these tasks being performed by humans is that it takes a long time, and a relatively low number of documents can be reviewed in a given amount of time. For example, to review a thirty-page document, a human reviewer may take a number of hours (e.g., 3 hours, 4 hours, etc.). In an enterprise that may generate on an order of a hundred documents per week, the enterprise may need a large number of reviewers that have to be trained to perform this task.

SUMMARY

With advances in computer technology, e.g., machine learning technologies, the document reviewing process may be performed automatically by a computer system, which may take only a few seconds. In some embodiments, a computing system may receive a document (e.g., a technical paper), identify sections of the document, and input each section into a corresponding machine learning model that has been trained using previously reviewed documents to process text and other data within a specific section. The machine learning model may output a score indicating the degree of compliance of a particular document. In addition, the computing system may identify various recommendations for content to be added to the document, and provide the score and the recommendations to the user.

Therefore, methods and systems are described herein for improving document content. A computing system may receive a document that includes a number of sections. The document may be in the form of an electronic file (e.g., a .doc or a .docx file), and the sections may include text, images, and/or other content. For example, a document may be a particular technical paper for a particular technology that an enterprise built or is using in a specific way. The document may include a number of sections, with each section having a title and content. For example, the document may include some common sections that are included in technical papers including "Modeling Approach," "Data," "Model Selection," "Outcome Analysis," and/or "Deployment and Reporting." The computing system may parse the document and determine, based on the content of each section of the document, a set of sections such that each section matches a predetermined section identified by a predetermined section template label. For example, the computing system may access section templates corresponding to predetermined sections. Each section template may include textual data, images, and or other content. Furthermore, each section template may be associated with a corresponding predetermined section template label. The "Modeling Approach" section may have a corresponding template with a "Modeling Approach" as the predetermined section template label. The "Modeling Approach" section template may include text, images, and/or other content.

The computing system may compare section titles to predetermined section template labels to identify matching sections. For example, the computing system may perform a string comparison on section titles and predetermined section template labels. In some embodiments, the computing system may use a machine learning model to match sections within a document with section templates. For example, the computing system may extract text data from a particular section and input that text data into a machine learning model to obtain an output that indicates a corresponding predetermined section template label. In some embodiments, the computing system may input any images and/or other data into the machine learning model if that data is part of the particular section. In some embodiments, computing system may determine the set of sections based on the content of each section of the document as it is related to the content within the plurality of section templates.

When the computing system identifies the set of sections, the computing system may iterate through each section and perform the following operations for each section in the set. The computing system may generate a vector representation of the section based on section content within the section of the document. The vector representation may include indications of words within the particular section. In some embodiments, the computing system may use an embedding model to generate the vector representation.

When the vector representation is generated, the computing system may input the vector representation of the section into a machine learning model corresponding to a section's predetermined section template label to obtain a score for the section of the document. For example, the computing system may have selected a section determined to match the "modeling approach" section template. The computing system may retrieve a predetermined section template label associated with the "modeling approach" section, and select a machine learning model corresponding to the "modeling approach" section. The output of the machine learning model may be a score indicating a degree of compliance for that section.

The machine learning models were trained using documents that were reviewed by human reviewers in the past. Thus, the computing system may receive electronic files (e.g., representative documents) such that each electronic file has set sections and corresponding predetermined section template labels for each section. The computing system may retrieve, from the electronic files, a first set of sections having a first predetermined section template label. For example, the computing system may retrieve from the electronic files, where it exists, the "modeling approach" section. The computing system may then train a first machine learning model corresponding to the first predetermined section template label (e.g., a machine learning model corresponding to the "modeling approach" section) by inputting the data for each section with the first predetermined section template label into the first machine learning model.

Furthermore, the computing system may input the vector representation of the section into a decision tree corresponding to the section to obtain a set of keywords for the section. Each section in the set of sections may correspond to a different decision tree. For example, the keywords may be top features of the decision tree. That is, when the vector representation is input into the decision tree, the decision tree may output top features for that vector representation. The top features may be keywords or key phrases for the vector representation. In some embodiments, the computing system inputs the vector representation of the section into the decision tree in response to determining that the score satisfies a threshold. For example, if a particular section does not have a predetermined degree of compliance, the vector representation is input into the decision tree.

When the computing system receives the keywords (e.g., top features) from the decision tree, the computing system may determine, based on the set of keywords, that one or more keywords are missing from the section. For example, the computing system may compare the keywords received from the decision tree with predetermined keywords for a particular section.

In some embodiments, to determine that one or more keywords are missing, the computing system may perform the following operations. The computing system may retrieve predetermined keywords from a section template associated with the corresponding section. For example, if the particular section has been identified as the "modeling approach" section, the computing system may retrieve the predetermined keywords from the section template associated with the "modeling approach" predetermined section template label. The computing system may compare the predetermined keywords (or key phrases) with keywords associated with the corresponding section, and determine, based on comparing the predetermined keywords with the keywords associated with the corresponding section, the one or more keywords missing from the corresponding section. In some embodiments, instead of the keywords, the computing system may compare top features received from the decision tree with keywords or features stored in associated with the corresponding section template. In some embodiments, the key features may include image and/or video content.

In response to determining that the one or more keywords are missing from the section, the computing system may generate one or more recommendations related to the one or more keywords, and provide, to a user, the score for the section of the document and the one or more recommendations. In some embodiments, to generate the recommendations, the computing system may select a keyword (or key phrase) identifier associated with a first keyword that is missing, and compare the keyword identifier with a plurality of keyword identifiers stored in a database, wherein each keyword identifier is stored in association with textual data representing a corresponding recommendation. The computing system may determine, based on comparing the keyword identifier with the plurality of keyword identifiers, data representing a first recommendation associated with the keyword identifier. For example, the recommendation may include text indicating that certain content is missing from the section.

Various other aspects, features and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data), unless the context clearly dictates otherwise.

BRIEF DESCRIPTION OF THE DRAWINGS

FIG. 2 illustrates a data structure for multiple section templates in accordance with one or more embodiments of this disclosure.

FIG. 5 illustrates some keywords and key phrases associated with exemplary sections in accordance with one or more embodiments of this disclosure.

FIG. 6 illustrates a table of keyword identifiers and corresponding recommendations in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
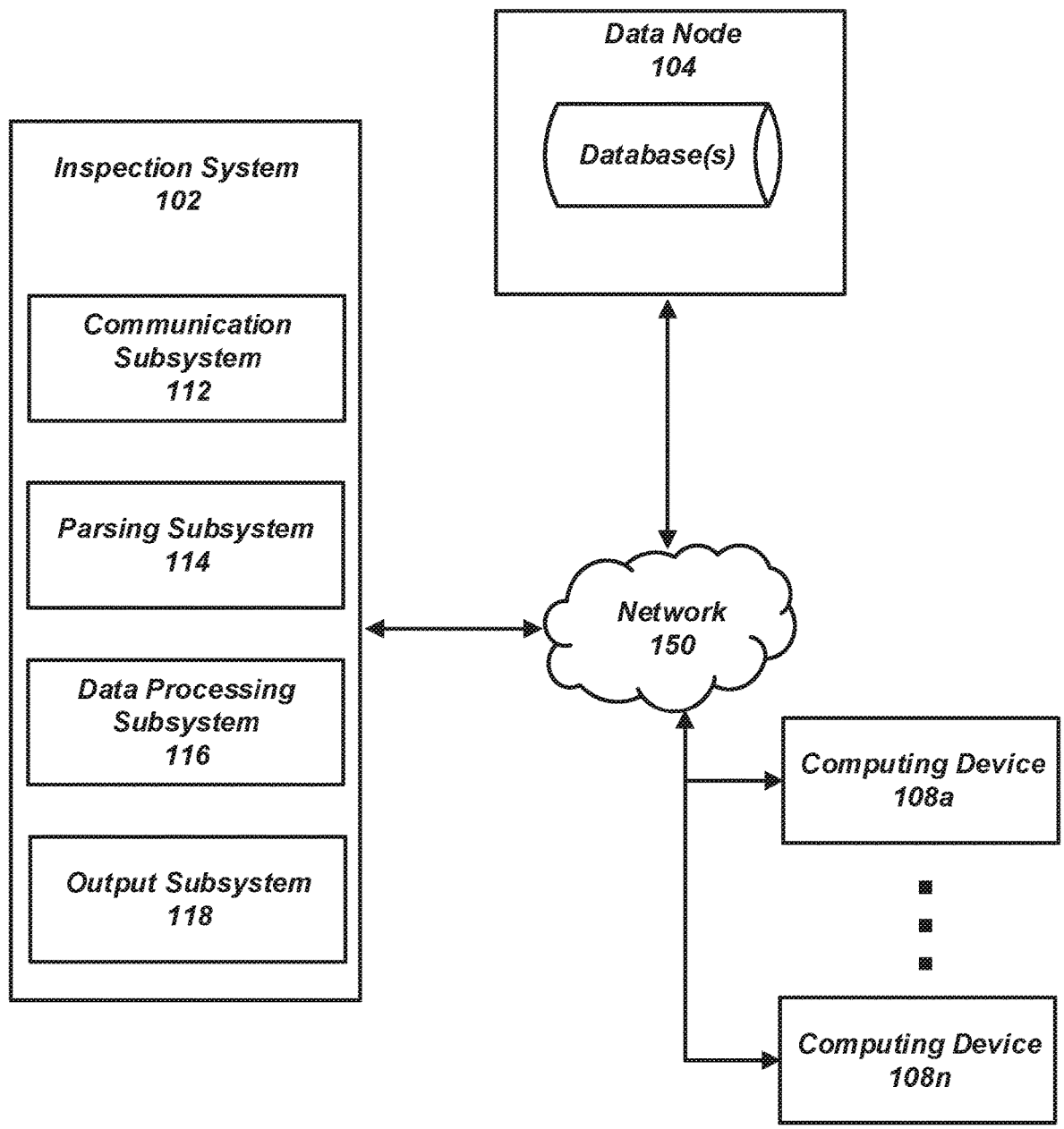
FIG. 1 shows an illustrative system for improving documents in accordance with one or more embodiments of this disclosure.

FIG. 1 shows environment 100, which includes a system for improving documents. Environment 100 includes inspection system 102, data node 104, and computing devices 108*a*-108*n*. Inspection system 102 may execute instructions for improving documents. Inspection system 102 may include software, hardware or a combination of the two. For example, inspection system 102 may be a physical server or a virtual server that is running on a physical computer system.

Data node 104 may store various data, including different documents that have been previously reviewed (e.g., inspected), and documents that were not previously reviewed (e.g., inspected). In some embodiments, data node 104 may store one or more machine learning models and decisions trees. In some embodiments, data node 104 may also be used to train the machine learning models and decision trees. Data node 104 may include software, hardware, or a combination of the two. For example, data node 104 may be a physical server, or a virtual server that is running on a physical computer system. Network 150 may be a local area network, a wide area network (e.g., the Internet), or a combination of the two. Computing devices 108*a*-108*n* may be end-user computing devices (e.g., desktop computers, laptops, electronic tablets and/or other computing devices used by end users).

Inspection system 102 may be configured to receive a document. In some embodiments, the document may be an electronic file that includes sections of text (e.g., textual sections), image data (e.g., within those sections), and/or a combination of text and image data. For example, inspection system 102 may receive the document from any of computing devices 108a-108n or from a data node 104, for example, when data node 104 stores electronic files representing documents created by end users. Inspection system 102 may receive the document using communication subsystem 112. Communication subsystem 112 may include software components, hardware components, or a combination of both. For example, communication subsystem 112 may include a network card (e.g., a wireless network card and/or a wired network card) that is coupled with software to drive the card. Communication subsystem 112 may store the document in memory in preparation for other operations. Communication subsystem 112 may pass the document, or a pointer to the document in memory, to parsing subsystem 114.

Parsing subsystem 114 may include software components, hardware components, or a combination of both. For example, parsing subsystem 114 may include software components that access the document in memory and/or storage and may use a processor to perform its operations. The parsing subsystem may perform the operations described below.

Parsing subsystem 114 may receive the document or a point to the document in memory and determine, based on content of each section of the document, a set of sections, such that each section in the set of sections matches a predetermined section identified by a predetermined section template label. For example, the received document may be a document that has a particular format outlining each section of the document. Each section of the document may include a title, some text, and/or one or more images. Parsing subsystem 114 may identify those sections (e.g., based on section titles, content of each section, and/or based on one or more other markers). Thus, parsing subsystem 114 may identify points within the document that delineate each section. Once parsing subsystem 114 delineates each section of the document, parsing subsystem 114 may match up one or more sections with one or more predetermined section identified by a corresponding predetermined section template label.

To match up one or more sections with one or more predetermined section identified by a corresponding predetermined section template label, parsing subsystem 114 may access a plurality of section templates corresponding to a plurality of predetermined sections. Each section template of the plurality of section templates may include textual data. Furthermore, each section template may be associated with a corresponding predetermined section template label. Thus, parsing subsystem 114 may determine the set of sections of the plurality sections based on the content of each section of the document as it is related to the content within the plurality of section templates.

FIG. 2 illustrates data structure 200 storing content for multiple section templates. Column 203 illustrates predetermined section template labels identifying sections of documents. Column 206 illustrates textual content that may be associated with the section template and column 209 illustrates image content that may be associated with the section template. A person skilled in the art would understand that the data structure may include one or more columns while excluding some of the other columns. For example, the data structure may include only column 203.

In some embodiments, parsing subsystem 114 may use column 203 to match a section of the document to an appropriate template. For example, parsing subsystem 114 may compare the predetermined section template label with the title or heading of a particular section to determine whether the text of the title or the heading match a predetermined section template label. Additionally or alternatively, parsing subsystem 114 may use content in column 206 to match the section of the document to an appropriate template. For example, parsing subsystem 114 may use text comparison functions to determine if enough words within a given section match the words within the textual content.

In some embodiments, parsing subsystem 114 may use a trained machine learning model to match a given section to a section template. For example, parsing subsystem 114 may train a model based on one or more of predetermined section template labels, textual content, or image content of previously identified sections, to match a given section to a correct section template. Thus, parsing subsystem 114 may extract first textual data from a first section of the plurality of sections. For example, when parsing subsystem 114 delineates the sections within a received document, parsing subsystem 114 may select a first section in the list and extract first textual data from that section. In some embodiments, if the section includes image data, parsing subsystem 114 may extract the image data as well. A person skilled in the art would understand that parsing subsystem 114 may extract textual data, image data, or a combination of both.

When the data (textual, image, or both) is extracted, parsing subsystem 114 may generate a vector representation for that data. Parsing subsystem 114 may input the first textual data into a first machine learning model to obtain an output that indicates a first predetermined section template label. For example, parsing subsystem 114 may input the vector representation of the data into the machine learning model. Parsing subsystem 114 may receive an output of the machine learning model that indicates a matching section template for the section. In some embodiments, the machine learning model may output multiple sections with probabilities and parsing subsystem 114 may select the section with the highest probability.

When at least some sections of the document have been delineated, those sections or pointers to those sections may be passed to data processing subsystem 116. Data processing subsystem 116 may include software components, hardware components, or a combination of both. For example, data processing subsystem 116 may include software components that accesses the document in memory and/or storage and may use one or more processors to perform its operations. Data processing subsystem 116 may process each received section and perform the following operations for each received section. Data processing subsystem 116 may generate a vector representation of the section based on section content within the section of the document. For example, data processing subsystem 116 may access the content of the received section (e.g., textual and/or image data) and generate a vector corresponding to that data. Data processing subsystem 116 may use one or more of the available words to vector techniques to perform this operation.

Data processing subsystem 116 may input the vector representation of the section into a machine learning model corresponding to a section's predetermined section template label to obtain a score for the section of the document.

In some embodiments, different machine learning models may be used for sections corresponding to different predetermined section template labels. That is, each section may be processed by a machine learning model trained for that kind of section. Thus, prior to inputting the vector representation into the machine learning model, data processing subsystem 116 may select the appropriate machine learning model. Data processing subsystem 116 may select a first section of the set of sections. For example, data processing subsystem 116 may be iterating through a particular section and may retrieve a first predetermined section template label associated with the first section. For example, when parsing subsystem 114 has determined the predetermined section template label for a particular section, parsing subsystem 114 may have stored an identifier associated with that predetermined section template label in association with the section. Thus, data processing subsystem 116 may retrieve that stored predetermined section template label.

Figure 3:
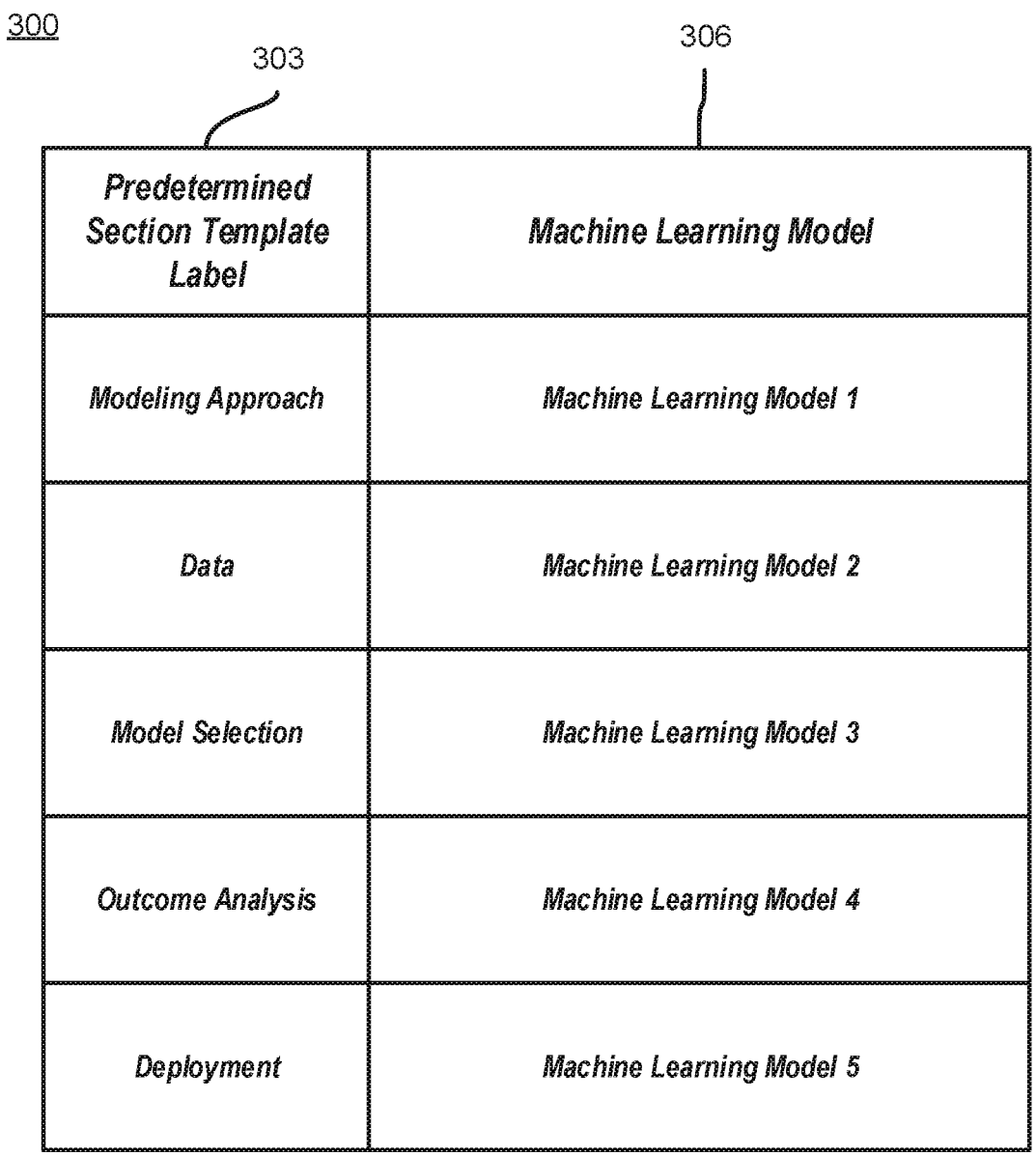
FIG. 3 illustrates a table that includes predetermined section template labels and associated machine learning models in accordance with one or more embodiments of this disclosure.

Data processing subsystem 116 may select a first machine learning model based on the first predetermined section template label. FIG. 3 illustrates table 300 that includes predetermined section template labels and associated machine learning models. Column 303 stores predetermined section template labels, while column 306 stores the corresponding machine learning models. Thus, data processing subsystem 116 may perform a lookup in the table of an appropriate machine learning model, based on the stored predetermined section template label. When the appropriate machine learning model is selected, data processing subsystem 116 may input the vector representation in the machine learning model.

Figure 4:
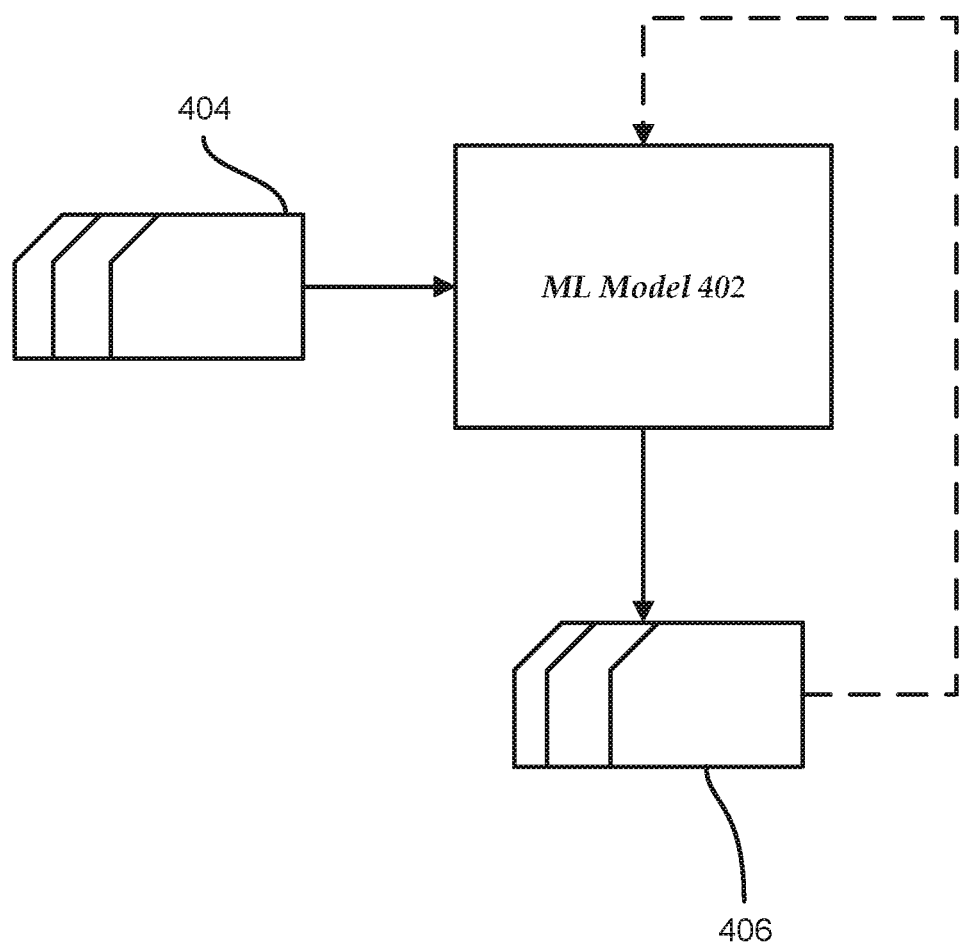
FIG. 4 illustrates an exemplary machine learning model in accordance with one or more embodiments of this disclosure.

FIG. 4 illustrates an exemplary machine learning model. Machine learning model 402 may take input 404 (e.g., a vector representing a particular section of the text) and may output a score associated with the section. The score may indicate a degree of compliance for that section as compared to sections used in training the model.

The output parameters may be fed back to the machine learning model as input to train the machine learning model (e.g., alone or in conjunction with user indications of the accuracy of outputs, labels associated with the inputs, or with other reference feedback information). The machine learning model may update its configurations (e.g., weights, biases, or other parameters) based on the assessment of its prediction (e.g., of an information source), and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. The machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

In some embodiments, the machine learning model may be trained using previously reviewed documents (e.g., reviewed by a human or by a previous process). Thus, environment 100 may include a training subsystem (not shown). The training subsystem may reside on inspection system 102, data node 104, or at another suitable location. The training subsystem may receive a plurality of electronic files representing documents. The electronic files may include a plurality of section sets (e.g., each type of section may be part of a set) and corresponding predetermined section template labels for the plurality of sections.

The training subsystem may start training using a first type of section template. Thus, the training subsystem may retrieve, from the plurality of electronic files, a first set of sections having a first predetermined section template label. For example, at least some of the electronic files may include a "modeling approach" section. Thus, the training subsystem may retrieve that section from each electronic file that includes that section. The training subsystem may train a first machine learning model corresponding to the first predetermined section template label by inputting textual data (and/or image data) for each section with the first predetermined section template label into the first machine learning model. The training subsystem may perform the same process for other sets of sections included in the electronic files.

When data processing subsystem 116 receives a score for the section from the machine learning model, data processing subsystem 116 may store that score and proceed with the next operation. Data processing subsystem 116 may input the vector representation of the section into a decision tree corresponding to the section to obtain a set of keywords for the section. Each section in the set of sections may correspond to a different decision tree of a plurality of decision trees. In some embodiments, data processing subsystem 116 may, instead of the vector representation, input another representation of the content of the section into the decision tree. For example, data processing subsystem 116 may encode the content of the section as text data stored in an electronic file (e.g., in an XML file or a text file).

In some embodiments, the obtained set of keywords may be a set of top features for the decision tree. Furthermore, the keywords may be key phrases. For example, the decision tree may output a set of top features that were used at arriving at decisions when the data was input into the decision tree. In some embodiments, the keywords may be the most used words in the section text.

In some embodiments, data processing subsystem 116 may input the vector representation of the section (or another representation of the content of the section) into the decision tree in response to determining that the score satisfies a threshold. For example, it might be desirable to give recommendations to an author to improve a particular technical document when that document does not reach a certain compliance score. However, if the document reaches a certain compliance score, recommendations for improving the document may not be necessary.

When data processing subsystem 116 receives the keywords, data processing subsystem 116 may determine, based on the set of keywords, that one or more keywords are missing from the section. As discussed above, the keywords may be top features, and may be words or phrases. In some embodiments, data processing subsystem 116 may perform the following operations to determine that some keywords are missing. Data processing subsystem may retrieve predetermined keywords (and/or key phrases) from a section template associated with the corresponding section. Thus, the predetermined keywords (and/or key phrases) may be stored in association with a corresponding template (e.g., in a template data structure). That is, FIG. 2 may have an additional column (or field) that can store keywords or key phrases associated with the corresponding section template.

Data processing subsystem 116 may compare the predetermined keywords with keywords associated with the corresponding section (e.g., through string comparison or another method) and determine, based on the comparison, that one or more keywords are missing from the corresponding section. That is, data processing subsystem 116 may match some keywords in the set of keywords (and/or key phrases) with keywords (and/or key phrases) stored within the corresponding section template. Some keywords within the section template may not have a match in the set of keywords (or key phrases). Those keywords (or key phrases) without a match may be identified as missing keywords (or key phrases).

FIG. 5 illustrates table 500 with some exemplary keywords and key phrases for some exemplary sections. Column 503 corresponds to a "modeling approach" section with exemplary keywords and key phrases below the predetermined template section label. Column 506 corresponds to a "development data" section with exemplary keywords and key phrases below the predetermined template section label. Column 509 corresponds to a "model selection" section with exemplary keywords and key phrases below the predetermined template section label. Column 512 corresponds to an "Outcome analysis" section with exemplary keywords and key phrases below the predetermined template section label.

In response to determining that the one or more keywords (or key phrases) are missing from the section, data processing subsystem 116 may generate one or more recommendations related to the one or more keywords (or key phrases). The recommendations may include text and/or images that indicate to a user what is missing from each section of the set sections of the document.

In some embodiments, data processing subsystem 116 may perform the below operations to generate the one or more recommendations. Data processing subsystem 116 may select a keyword identifier associated with a first keyword of the one or more keywords that are missing. For example, when data processing subsystem 116 identifies the missing keywords (or key phrases), the data processing subsystem may store those keywords in a data structure (e.g., an array). When generating the one or more recommendations, data processing subsystem 116 may access those missing keywords (or key phrases) and iterate through each one.

Data processing subsystem 116 may compare the keyword identifier for each keyword (or key phrase) with a plurality of keyword identifiers stored in a database. Each keyword identifier may be stored in association with textual data representing a corresponding recommendation. FIG. 6 illustrates table 600 of keyword identifiers and corresponding recommendations that may be stored in a database (e.g., at data node 104). Column 603 stores keyword identifiers. In some embodiments, keyword identifiers may be keywords or key phrases themselves. In some embodiments, to save space, keywords and/or key phrases may be hashed into identifiers. A person skilled in the art would understand that other ways of generating and storing keyword identifiers may be used in the context of this disclosure. Column 606 may store recommendations corresponding to keyword identifiers of column 603.

Data processing subsystem 116 may determine, based on comparing the keyword identifier (e.g., for each keyword) with the plurality of keyword identifiers, first textual data representing a first recommendation associated with the keyword identifier. For example, data processing subsystem 116 may compare each keyword identifier with keyword identifiers in column 603 and access the corresponding recommendation when the keyword identifiers match.

When the score for each section of the set of sections and one or more recommendations are generated, data processing subsystem 116 may pass the scores and the recommendations to output subsystem 118. Output subsystem 118 may include software components, hardware components, or a combination of both. For example, output subsystem 118 may include software components that generate data for display and may use a processor to perform its operations. Output subsystem 118 may provide, to a user, the score for the section of the document and the one or more recommendations. In some embodiments, output subsystem 118 may store scores and recommendations as they are generated by the data processing subsystem 116. When the document has been processed, output subsystem 118 may generate an output data structure with that information.

In some embodiments, output subsystem 118 may reside on a user's computing device. The computing device may include a display. Thus, output subsystem 118 may generate for display the scores for the set of sections, and corresponding recommendations. In some embodiments, output subsystem 118 may reside on a computing device that is not in the vicinity of the user (e.g., a server). Thus, output subsystem 118 may generate a message with the scores for the set of sections, and the corresponding recommendations. Output subsystem 118 may pass the message to communication subsystem 112. Communication subsystem 112 may transmit the message over network 150, for example, to one of computing devices 108a-108n.

Figure 7:
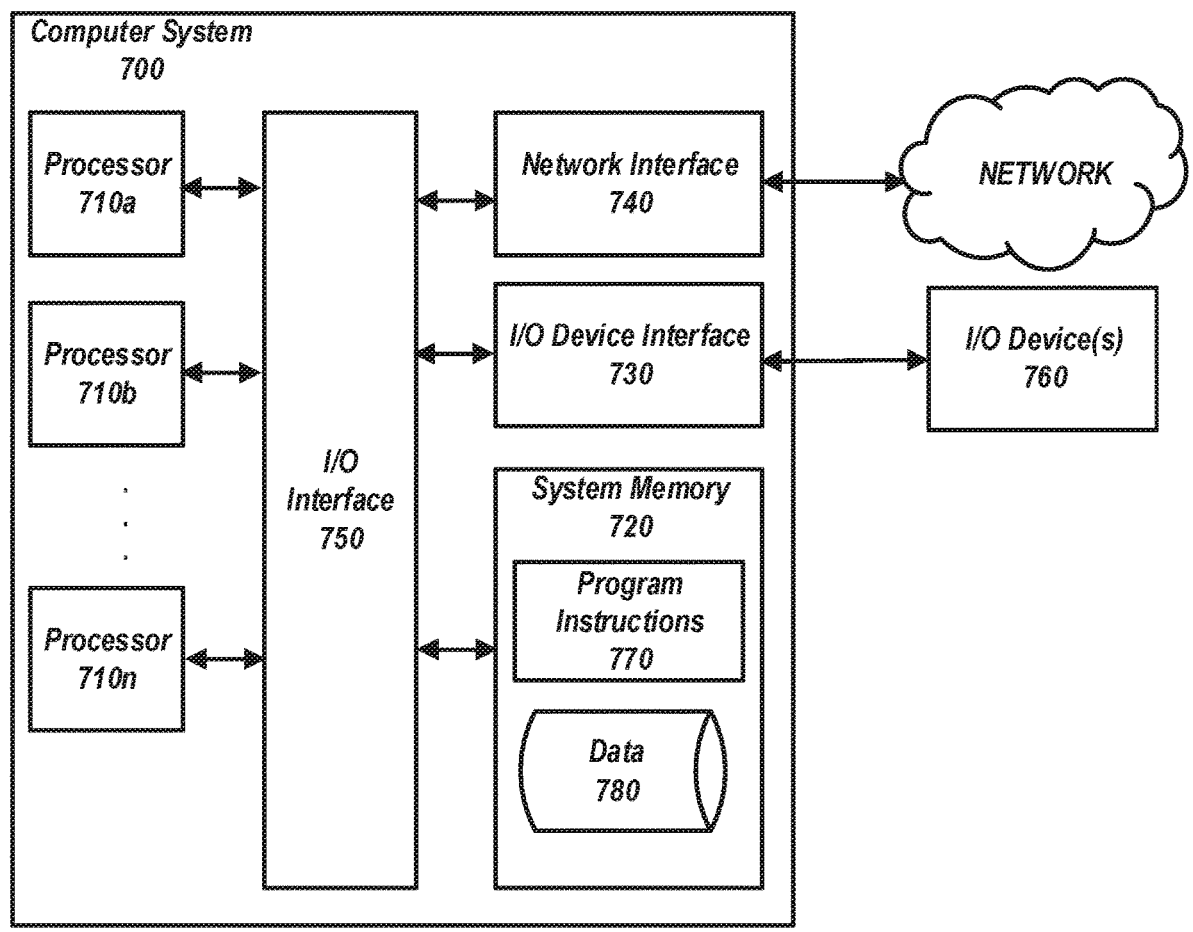
FIG. 7 shows an example computing system that may be used in accordance with one or more embodiments of this disclosure.

FIG. 7 shows an example computing system that may be used in accordance with some embodiments of this disclosure. In some instances, computing system 700 is referred to as a computer system. A person skilled in the art would understand that those terms may be used interchangeably. The components of FIG. 7 may be used to perform some or all operations discussed in relation with FIGS. 1-6. Furthermore, various portions of the systems and methods described herein may include or be executed on one or more computer systems similar to computing system 700. Further, processes and modules described herein may be executed by one or more processing systems similar to that of computing system 700.

Computing system 700 may include one or more processors (e.g., processors 710a-710n) coupled to system memory 720, an input/output I/O device interface 730, and a network interface 740 via an input/output (I/O) interface 750. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 700. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 720). Computing system 700 may be a uni-processor system including one processor (e.g., processor 710a), or a multi-processor system including any number of suitable processors (e.g., 710a-710n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 700 may include a plurality of computing devices (e.g., distributed computer systems) to implement various processing functions.

I/O device interface 730 may provide an interface for connection of one or more I/O devices 760 to computer system 700. I/O devices may include devices that receive input (e.g., from a user) or output information (e.g., to a user). I/O devices 760 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 760 may be connected to computer system 700 through a wired or wireless connection. I/O devices 760 may be connected to computer system 700 from a remote location. I/O devices 760 located on remote computer systems, for example, may be connected to computer system 700 via a network and network interface 740.

Network interface 740 may include a network adapter that provides for connection of computer system 700 to a network. Network interface 740 may facilitate data exchange between computer system 700 and other devices connected to the network. Network interface 740 may support wired or wireless communication. The network may include an electronic communication network, such as the Internet, a local area network (LAN), a wide area network (WAN), a cellular communications network, or the like.

System memory 720 may be configured to store program instructions 770 or data 780. Program instructions 770 may be executable by a processor (e.g., one or more of processors 710a-710n) to implement one or more embodiments of the present techniques. Instructions 770 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site, or distributed across multiple remote sites and interconnected by a communication network.

System memory 720 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 720 may include a non-transitory computer readable storage medium that may have program instructions stored thereon that are executable by a computer processor (e.g., one or more of processors 710a-710n) to cause the subject matter and the functional operations described herein. A memory (e.g., system memory 720) may include a single memory device and/or a plurality of memory devices (e.g., distributed memory devices).

I/O interface 750 may be configured to coordinate I/O traffic between processors 710a-710n, system memory 720, network interface 740, 110 devices 760, and/or other peripheral devices. I/O interface 750 may perform protocol, timing, or other data transformations to convert data signals from one component (e.g., system memory 720) into a format suitable for use by another component (e.g., processors 710a-710n). I/O interface 750 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 700, or multiple computer systems 700 configured to host different portions or instances of embodiments. Multiple computer systems 700 may provide for parallel or sequential processing/execution of one or more portions of the techniques described herein.

Those skilled in the art will appreciate that computer system 700 is merely illustrative and is not intended to limit the scope of the techniques described herein. Computer system 700 may include any combination of devices or software that may perform or otherwise provide for the performance of the techniques described herein. For example, computer system 700 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 700 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 8:
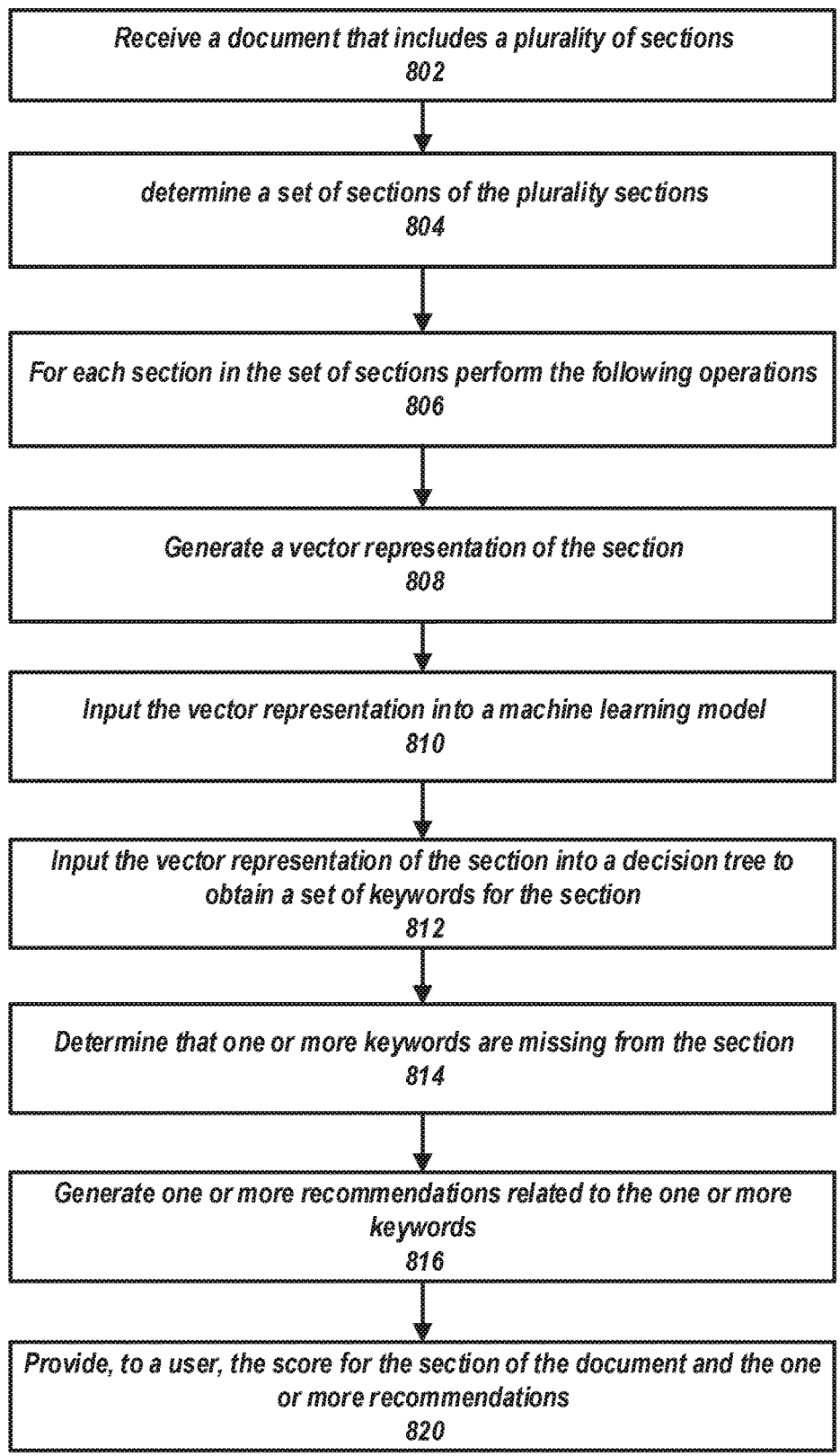
FIG. 8 is a flowchart of operations for improving documents in accordance with one or more embodiments of this disclosure.

FIG. 8 is a flowchart 800 of operations for improving documents. The operations of FIG. 8 may use components described in relation to FIG. 7. In some embodiments, inspection system 102 may include one or more components of computer system 700. One or more steps of the flowchart 800 may be rearranged, omitted, and/or otherwise modified, and/or other steps may be added as appropriate.

At 802, inspection system 102 receives a document that includes a plurality of sections. For example, the inspection system may receive the document from a data node 104 from one of computing devices 108*a*-108*n*. Inspection system 102 may receive the document over network 150 using network interface 740.

At 804, inspection system 102 determines a set of sections of the plurality sections. The termination may be based on the content of each section of the document. Furthermore, each section in the set of sections may be determined to match a predetermined section identified by a predetermined section template label. Inspection system 102 may use one or more processors 710*a*, 710*b*, and/or 710*n*.

At 806, for each section in the set of sections, inspection system 102 performs the following operations. For example, inspection system 102 may, using one or more processors 710*a*-710*n*, iterate through each section in the set of sections and perform operations discussed below. At 808, inspection system 102 generates a vector representation of the section. The vector representation may be generated based on section content within the section of the document. Inspection system 102 may store the vector representation in system memory 720 (e.g., as part of data 780)

At 810, inspection system 102 inputs the vector representation of the section into a machine learning model. The machine learning model may correspond to a section s predetermined section template label. The machine learning model may return a score for the section of the document. For example, the machine learning model may reside on the same physical or logical computing device the inspection system 102 resides on. Thus, inspection system 102 may use one or more processors (e.g., processor 710*a*) to input the vector representation into the machine learning model. In some embodiments, the machine learning model may reside on another computing device (e.g., on data node 104). Thus, inspection system 102 may transmit the data to that node.

At 812, inspection system 102 inputs the vector representation of the section into a decision tree to obtain a set of keywords for the section. Each section in the set of sections may correspond to a different decision tree of a plurality of decision trees. The decision tree may return one or more keywords (or key phrases) for the section of the document. In some embodiments, the keywords may be top features of the decision tree. The decision tree may reside on the same physical or logical computing device that the inspection system 102 resides on. Thus, inspection system 102 may use one or more processors (e.g., processor 710*a*) to input the vector representation into the decision tree. In some embodiments, the decision tree may reside on another computing device (e.g., on data node 104). Thus, inspection system 102 may transmit the data to that node.

At 814, inspection system 102 determines, based on the set of keywords, that one or more keywords are missing from the section. For example, inspection system 102 may use one or more processors (e.g., processor 710*a*, 710*b*, and or 710*n*) to perform the operation. At 816, inspection system 102 generates one or more recommendations related to the one or more keywords. In some embodiments, the generation operation may be performed, in response to determining that one or more keywords are missing from the section. Inspection system 102 may perform this operation using one or more processors (e.g., processor 710*a*, 710*b*, and or 710*n*), and may store the results in system memory 720.

At 820, inspection system 102 provides, to the user, the score for the section of the document, and the one or more recommendations. In some embodiments, inspection system 102 may use I/O device interface 730 to provide the data to an I/O device 760 (e.g., a display). In some embodiments, inspection system 102 may transmit the scores and the recommendations to another computing device (e.g., data node 104) using network interface 740.

Although the present invention has been described in detail for the purpose of illustration based on what is currently considered to be the most practical and preferred embodiments, it is to be understood that such detail is solely for that purpose, and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment. Accordingly, the scope of the disclosure should be determined not by the examples, but by the appended claims and their equivalents.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for improving document content, the method comprising: receiving a document comprising a plurality of sections; determining, based on content of each section of the document, a set of sections of the plurality sections, wherein each section in the set of sections matches a predetermined section identified by a predetermined section template label; and for each section in the set of sections: generating a vector representation of the section based on section content within the section of the document; inputting the vector representation of the section into a machine learning model corresponding to a section's predetermined section template label to obtain a score for the section of the document; inputting the vector representation of the section into a decision tree corresponding to the section to obtain a set of keywords for the section, wherein each section in the set of sections corresponds to a different decision tree of a plurality of decision trees; determining, based on the set of keywords, that one or more keywords are missing from the section; in response to determining that the one or more keywords are missing from the section, generating one or more recommendations related to the one or more keywords; and providing, to a user, the score for the section of the document and the one or more recommendations.

2. Any of the proceeding embodiments, wherein inputting the vector representation of the section into the decision tree corresponding to the section to obtain the one or more keywords for the section is performed in response to determining that the score satisfies a threshold.

3. Any of the proceeding embodiments, wherein determining the set of sections of the plurality of sections comprises: accessing a plurality of section templates corresponding to a plurality of predetermined sections, wherein each section template of the plurality of section templates comprises textual data, and wherein each section template is associated with a corresponding predetermined section template label; and determining the set of sections of the plurality of sections based on the content of each section of the document as it is related to the content within the plurality of section templates.

4. Any of the proceeding embodiments, wherein determining the set of sections comprises: extracting first textual data from a first section of the plurality of sections; and inputting the first textual data into a first machine learning model to obtain an output that indicates a first predetermined section template label.

5. Any of the proceeding embodiments, wherein inputting the vector representation of the section into the machine learning model corresponding to the section's predetermined section template label comprises: selecting a first section of the set of sections; retrieving a first predetermined section template label associated with the first section; and selecting a first machine learning model based on the first predetermined section template label.

6. Any of the proceeding embodiments, further comprising: receiving a plurality of electronic files comprising a plurality of sets sections and corresponding predetermined section template labels for the plurality of sections; retrieving, from the plurality of electronic files, a first set of sections having a first predetermined section template label; and training a first machine learning model corresponding to the first predetermined section template label by inputting textual data for each section with the first predetermined section template label into the first machine learning model.

7. Any of the proceeding embodiments, wherein determining whether the one or more keywords are missing from a corresponding section comprises: retrieving predetermined keywords from a section template associated with the corresponding section; comparing the predetermined keywords with keywords associated with the corresponding section; and determining, based on comparing the predetermined keywords with the keywords associated with the corresponding section, the one or more keywords missing from the corresponding section.

8. Any of the proceeding embodiments, wherein generating the one or more recommendations for each missing keyword comprises: selecting a keyword identifier associated with a first keyword of the one or more keywords that are missing; comparing the keyword identifier with a plurality of keyword identifiers stored in a database, wherein each keyword identifier is stored in association with textual data representing a corresponding recommendation; and determining, based on comparing the keyword identifier with the plurality of keyword identifiers, first textual data representing a first recommendation associated with the keyword identifier.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for improving document content, the system comprising:
one or more processors; and
a non-transitory computer-readable storage medium storing instructions, which when executed by the one or more processors cause the one or more processors to:
receive a document comprising a plurality of textual sections;
access a plurality of section templates corresponding to a plurality of predetermined sections, wherein each section template of the plurality of section templates comprises corresponding textual data, and wherein each section template is associated with a corresponding predetermined section template label of a plurality of predetermined section labels;
determine, using textual data within the plurality of section templates, a set of textual sections of the plurality of textual sections, such that each section of the set of textual sections matches a predetermined section identified by a predetermined section template label of the plurality of predetermined section labels; and
for a section in the set of textual sections:
generate a vector representation of the section based on section textual data within the section of the document;
input the vector representation of the section into a machine learning model corresponding to the section to obtain a score for the section of the document, wherein each section in the set of textual sections corresponds to a different machine learning model of a plurality of machine learning models, and wherein each machine learning model has been trained using training data associated with each corresponding to the section, and wherein output parameters of each machine learning model are automatically fed back into each corresponding machine learning model as input to further adjust weights or biases of each machine learning model;

in response to determining that the score satisfies a threshold, encoding section content of the section into a textual representation;

input the textual representation of the section into a decision tree corresponding to the section to obtain a set of top features for the section, wherein each section in the set of textual sections corresponds to a different decision tree of a plurality of decision trees;

in response to determining that one or more top features are missing from the section, generating one or more recommendations related to the one or more top features; and provide, to a user, the one or more recommendations and the score.

2. The system of claim 1, wherein the instructions that cause the one or more processors to determine, the set of textual sections of the plurality of textual sections cause the one or more processors to:

extract first textual data from a first section of the set of textual sections; and input the first textual data into a prediction model to obtain an output that indicates a first predetermined section template label corresponding to the first section.

3. The system of claim 1, wherein the instructions that cause the one or more processors to input the vector representation of the section into the machine learning model corresponding to the section to obtain the score for the section of the document cause the one or more processors to:

select a first section of the set of textual sections;

retrieve a first predetermined section template label corresponding to the first section; and select a first machine learning model based on the first predetermined section template label.

4. The system of claim 1, wherein the instructions further cause the one or more processors to:

receive a plurality of electronic files comprising a plurality of sections and corresponding predetermined section template labels for the plurality of sections;

retrieve, from one or more electronic files of the plurality of electronic files, a set of sections having a first predetermined section template label; and train a first machine learning model corresponding to the first predetermined section template label by inputting first textual data for a first section in the set of textual sections and the first predetermined section template label into the first machine learning model.

5. A method for improving document content, the method comprising:

receiving a document comprising a plurality of sections;

determining, based on content of each section of the document, a set of sections of the plurality of sections, wherein each section in the set of sections matches a predetermined section identified by a predetermined section template label; and for a section in the set of sections:

generating a vector representation of the section based on section content within the section of the document;

inputting the vector representation of the section into a machine learning model of a plurality of machine learning models, each corresponding to a section's predetermined section template label to obtain a score for the section of the document, wherein each machine learning model of the plurality of machine learning models has been trained using training data associated with a corresponding to the section, and wherein output parameters of each machine learning model are automatically fed back into each corresponding machine learning model as input to further adjust weights or biases of each machine learning model;

in response to determining that the score satisfies a threshold, encoding the section content of the section into a textual representation;

inputting the textual representation of the section into a decision tree corresponding to the section to obtain a set of keywords for the section, wherein each section in the set of sections corresponds to a different decision tree of a plurality of decision trees;

determining, based on the set of keywords, that one or more keywords are missing from the section;

in response to determining that the one or more keywords are missing from the section, generating one or more recommendations related to the one or more keywords; and providing, to a user, the score for the section of the document and the one or more recommendations.

6. The method of claim 5, wherein determining the set of sections of the plurality of sections comprises:

accessing a plurality of section templates corresponding to a plurality of predetermined sections, wherein each section template of the plurality of section templates comprises textual data, and wherein each section template is associated with a corresponding predetermined section template label; and determining the set of sections of the plurality of sections based on the content of each section of the document as it is related to the content within the plurality of section templates.

7. The method of claim 5, wherein determining the set of sections comprises:

extracting first textual data from a first section of the plurality of sections; and inputting the first textual data into a first machine learning model to obtain an output that indicates a first predetermined section template label.

8. The method of claim 5, wherein inputting the vector representation of the section into the machine learning model corresponding to the section's predetermined section template label comprises:

selecting a first section of the set of sections;

retrieving a first predetermined section template label associated with the first section; and selecting a first machine learning model based on the first predetermined section template label.

9. The method of claim 5, further comprising:

receiving a plurality of electronic files comprising a plurality of sets sections and corresponding predetermined section template labels for the plurality of sections;

retrieving, from the plurality of electronic files, a first set of sections having a first predetermined section template label; and training a first machine learning model corresponding to the first predetermined section template label by inputting textual data for each section with the first predetermined section template label into the first machine learning model.

10. The method of claim 5, wherein determining whether the one or more keywords are missing from a corresponding section comprises:

retrieving predetermined keywords from a section template associated with the corresponding section;

comparing the predetermined keywords with keywords associated with the corresponding section; and determining, based on comparing the predetermined keywords with the keywords associated with the corresponding section, the one or more keywords missing from the corresponding section.

11. The method of claim 5, wherein generating the one or more recommendations for each missing keyword comprises:
selecting a keyword identifier associated with a first keyword of the one or more keywords that are missing;
comparing the keyword identifier with a plurality of keyword identifiers stored in a database, wherein each keyword identifier is stored in association with textual data representing a corresponding recommendation; and
determining, based on comparing the keyword identifier with the plurality of keyword identifiers, first textual data representing a first recommendation associated with the keyword identifier.

12. The method of claim 5, further comprising:
back propagating an error magnitude based on a forward pass that has been completed; and
updating connection weights based on the error magnitude.

13. The method of claim 5, further comprising: back propagating an error magnitude based on a forward pass that has been completed; and updating connection weights based on the error magnitude.

14. A non-transitory, computer-readable medium for improving document content, storing instructions that, when executed by one or more processors, cause the one or more processors to perform operations comprising:
receiving a document comprising a plurality of sections;
determining, based on content of each section of the document, a set of sections of the plurality of sections, wherein each section in the set of sections matches a predetermined section identified by a predetermined section template label; and
for a section in the set of sections:
generating a vector representation of the section based on section content within the section of the document;
inputting the vector representation of the section into a machine learning model of a plurality of machine learning models, each corresponding to a section's predetermined section template label to obtain a score for the section of the document, wherein each machine learning model of the plurality of machine learning models has been trained using training data associated with a corresponding to the section, and wherein output parameters of each machine learning model are automatically fed back into each corresponding machine learning model as input to further adjust weights or biases of each machine learning model;
in response to determining that the score satisfies a threshold, encoding the section content of the section into a textual representation;
inputting the textual representation of the section into a decision tree corresponding to the section to obtain a set of keywords for the section, wherein each section in the set of sections corresponds to a different decision tree of a plurality of decision trees;
determining, based on the set of keywords, that one or more keywords are missing from the section;
in response to determining that the one or more keywords are missing from the section, generating one or more recommendations related to the one or more keywords; and providing, to a user, the score for the section of the document and the one or more recommendations.

15. The non-transitory, computer-readable medium of claim 14, wherein the instructions for determining the set of sections of the plurality of sections cause the one or more processors to:
access a plurality of section templates corresponding to a plurality of predetermined sections, wherein each section template of the plurality of section templates comprises textual data, and wherein each section template is associated with a corresponding predetermined section template label; and
determine the set of sections of the plurality of sections based on the content of each section of the document as it is related to the content within the plurality of section templates.

16. The non-transitory, computer-readable medium of claim 14, wherein the instructions for determining the set of sections cause the one or more processors to:
extract first textual data from a first section of the plurality of sections; and
input the first textual data into a first machine learning model to obtain an output that indicates a first predetermined section template label.

17. The non-transitory, computer-readable medium of claim 14, wherein the instructions for inputting the vector representation of the section into the machine learning model corresponding to the section's predetermined section template label cause the one or more processors to:
select a first section of the set of sections;
retrieving a first predetermined section template label associated with the first section; and
select a first machine learning model based on the first predetermined section template label.

18. The non-transitory, computer-readable medium of claim 14, the instructions further causing the one or more processors to:
receive a plurality of electronic files comprising a plurality of sets sections and corresponding predetermined section template labels for the plurality of sections;
retrieve, from the plurality of electronic files, a first set of sections having a first predetermined section template label; and
train a first machine learning model corresponding to the first predetermined section template label by inputting textual data for each section with the first predetermined section template label into the first machine learning model.

19. The non-transitory, computer-readable medium of claim 14, wherein the instructions for determining that the one or more keywords are missing from a corresponding section cause the one or more processors to:
retrieve predetermined keywords from a section template associated with the corresponding section;
compare the predetermined keywords with keywords associated with the corresponding section; and
determine, based on comparing the predetermined keywords with the keywords associated with the corresponding section, the one or more keywords missing from the corresponding section.

20. The non-transitory, computer-readable medium of claim 14, wherein the instructions for generating the one or more recommendations for each missing keyword cause the one or more processors to:
select a keyword identifier associated with a first keyword of the one or more keywords that are missing;

compare the keyword identifier with a plurality of keyword identifiers stored in a database, wherein each keyword identifier is stored in association with textual data representing a corresponding recommendation; and determine, based on comparing the keyword identifier with the plurality of keyword identifiers, first textual data representing a first recommendation associated with the keyword identifier.

\* \* \* \* \*